United States Patent

[11] 3,543,723

| [72] | Inventor | Carl W. Van Gilst<br>Goshen, Indiana |
|---|---|---|
| [21] | Appl. No. | 793,024 |
| [22] | Filed | Jan. 22, 1969 |
| [45] | Patented | Dec. 1, 1970 |
| [73] | Assignee | Bangor Punta Operations Inc.<br>New York, New York<br>a corporation of New York |

[54] SOW FEED STALL
7 Claims, 4 Drawing Figs.

| [52] | U.S. Cl. | 119/27 |
|---|---|---|
| [51] | Int. Cl. | A01k 5/00 |
| [50] | Field of Search | 119/27, 20, 98, 99, 28, 51 |

[56] References Cited
UNITED STATES PATENTS

| 579,484 | 3/1897 | Jarrett | 119/27 |
|---|---|---|---|
| 1,873,493 | 8/1932 | Scott | 119/27 |
| 3,415,227 | 12/1968 | Welsh | 119/27 |
| 3,473,515 | 10/1969 | Atchinson, Sr. | 119/27 |

*Primary Examiner*—Hugh R. Chamblee
*Attorneys*—Hobbs and Green and Kemon

ABSTRACT: A sow stall having a door at one end and a feeding container at the other end and a false door in the stall pivotally disposed between the two ends and connected to the door by a linkage for closing the door as the sow approaches the feeding container. An over center spring is used to releasably retain the door in either its closed or opened position.

Patented Dec. 1, 1970

3,543,723

INVENTOR.
CARL W. VAN GILST

BY Hobbs & Green

ATTORNEYS

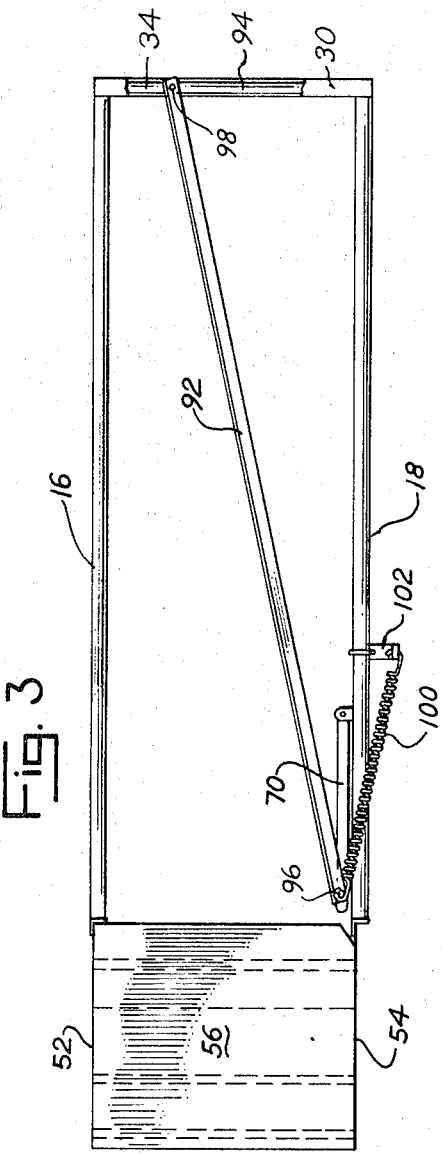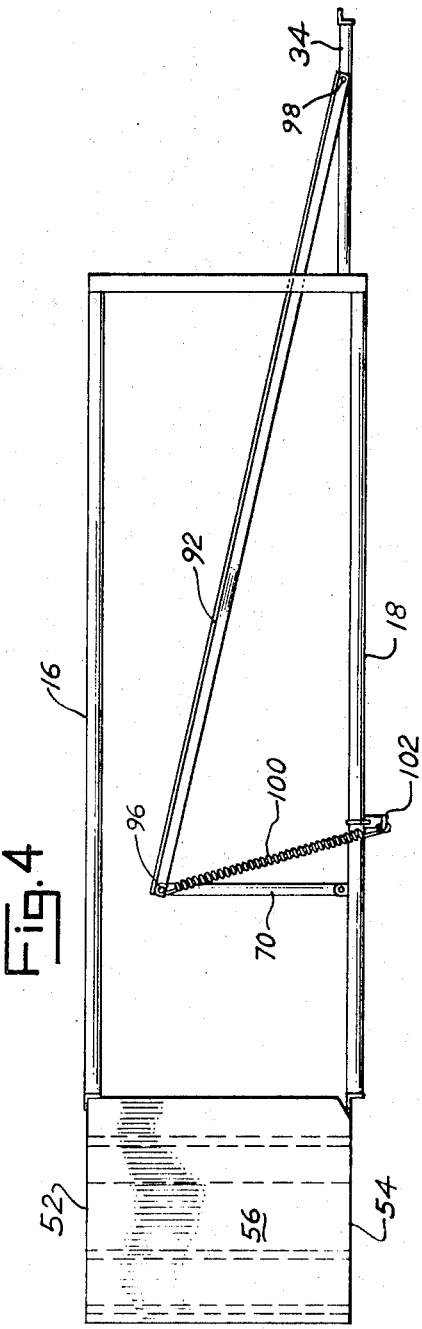

SOW FEED STALL

It is generally recognized that sows can be kept in better condition and will farrow more pigs if they are subjected to controlled feeding to limit the amount and regulate the kind of feed which the sows receive. If, however, the sows are fed in groups, the more aggressive sows will often receive more of the feed than required for optimum physical condition while the remainder of the group will frequently be underfed. Attempts have been made in the past to use stalls to feed the sows individually, but this has been unsatisfactory since it has entailed special work and handling to make sure that there was one sow in each stall and to prevent another sow from driving the first sow from the stall. Further, the mere use of a gate to close the stalls has likewise been unsatisfactory in that it has required closing and/or opening of the gate by an operator when the sows were to be fed or after they had completed their feeding. It is therefore one of the principal objects of the present invention to provide a sow stall which will permit only one sow to enter the stall at any one time and which will permit the sow to leave the stall without interference when it has finished feeding.

Another object of the invention is to provide a sow stall having a gate which can easily and effectively be operated by the sow as it enters the stall for feeding and as it desires to leave the stall, and which prevents another sow from entering the stall while the first sow is still feeding.

Still another object of the invention is to provide a relatively simple sow stall construction with a gate which will be operated by the sow in the normal process of entering the stall and reaching for the feed, the gate being automatically closed and opened by the sow, and which cannot be opened by a sow outside the stall while another sow is in the stall.

A further object of the invention is to provide a feed container for use in conjunction with a stall, which can be filled without opening a door or lid, but which protects the feed therein from rain and snow and which serves as a shield to prevent the sow from seeing the operator or sows in neighboring stalls.

Additional objects and advantages of the invention will become apparent from the following description and accompanying drawings, wherein:

FIG. 3 is a top plan view of the sow pen shown in the preceding FIGS., illustrating the gate and operating mechanism in closed position; and FIG. 4 is a top plan view similar to that shown in FIG. 3 with the gate and operating mechanism illustrated in open position.

Figure 1:
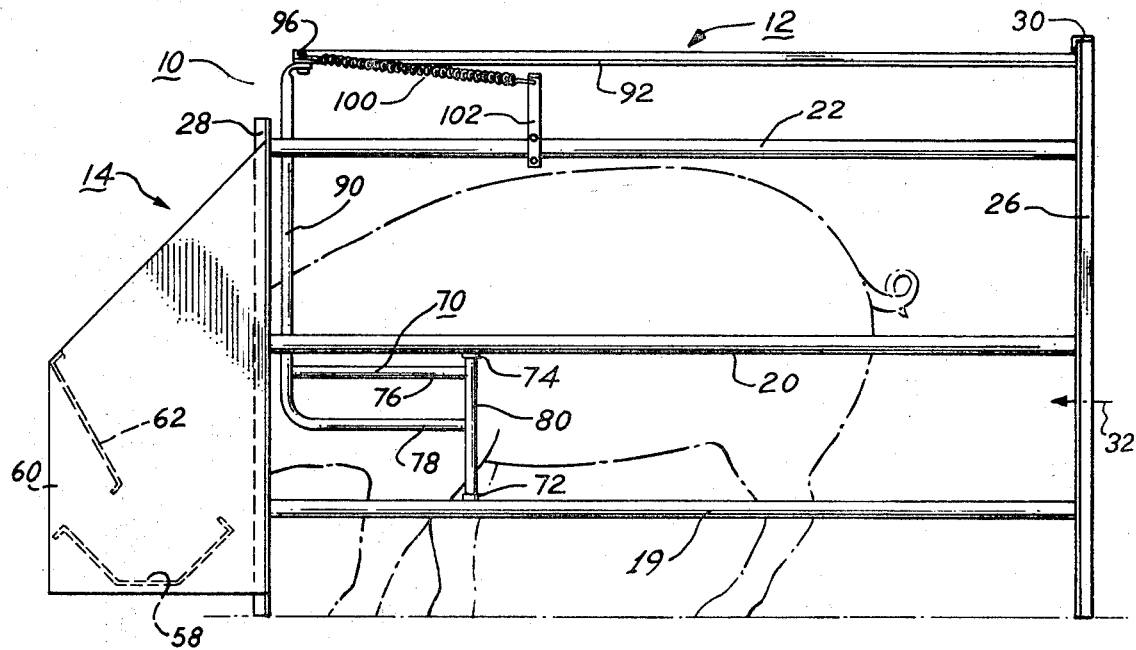
FIG. 1 is a side elevational view of a sow pen embodying the present invention.
Figure 2:
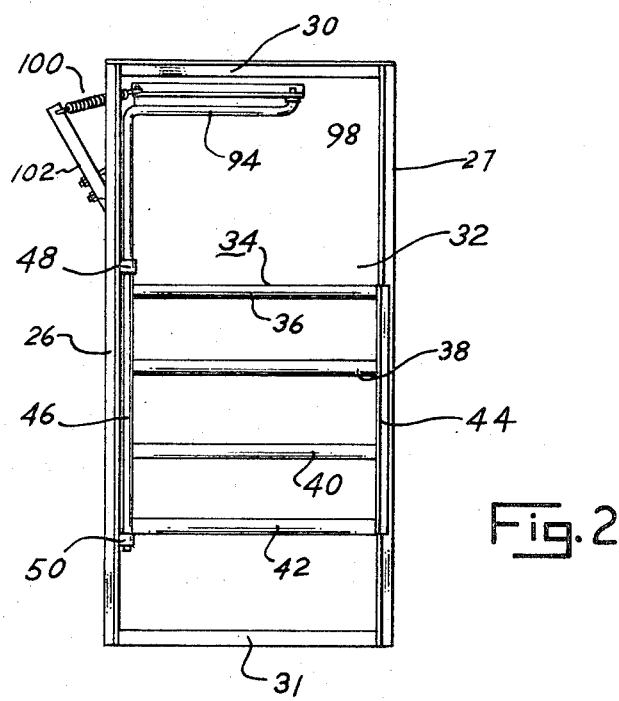
FIG. 2 is an end elevational view of the sow pen shown in FIG. 1.

Referring more specifically to the drawings and to FIG. 1 in particular, numeral 10 designates generally the present sow feeding pen which consists of two principal sections, numeral 12 designating the pen section and numeral 14 the feed container section. The two sections are assembled as an integral unit, with the feed section forming one end of the pen section. The pen illustrated in the drawing is a single unit; however, the pen may be a part of a system consisting of a series of pens placed side-by-side or arranged in any other suitable configuration.

The pen section 12 consists of two sidewalls 16 and 18 formed by horizontal bars 19, 20 and 22 supported at one end by vertical posts 26 and 27, and at the other end by posts 28 of container 14. The particular construction of the sidewalls 16 and 18 is not critical with respect to the present invention, and while rods such as those shown in the drawings are preferred, the sidewalls may be panels or any other suitable type of wall structure. The upper ends of posts 26 and 27 are connected by a cross member 30 to form a rigid structure, and a cross member 31 is also used to connect the lower ends of posts 26 and 27. The opening 32 to the stall is at the right hand end as viewed in FIGS. 1, 3 and 4, and this opening is closed by gate or door 34 consisting of horizontal bars 36, 38, 40 and 42 supported by vertical members 44 and 46. The gate is hinged on posts 26 and 27 by sleeves 48 and 50 at the top and bottom of the gate. The sleeves are joined rigidly to post 26 and the gate is free to swing from its closed position, as illustrated in FIG. 3 to its opened position as illustrated in FIG. 4.

Feed container 14 is mounted on posts 28 and consists of sides 52 and 54 and top 56, and the front of the container is open to permit the sow to reach the feed. A horizontal trough 58 in the lower part of the container receives feed through an opening 60 in the rear of the container, and a baffle 62 extending downwardly and inwardly from the rear edge of top 56 assists in directing the feed into trough 58 and restricts the view of the sow while feeding from trough 58. The construction of the container permits the feed to be placed in the trough without the operator having to open or close any doors or lids, and protects the feed in the trough from rain, snow and foreign material, such as dust and dirt, thereby maintaining the feed in satisfactory condition for feeding.

The gate 34 is operated by the sow through a mechanism consisting of a false gate or other obstruction such as a bar 70, pivotally mounted on bars 19 and 20 by bearing fixtures 72 and 74, respectively. The false gate consists of two horizontal bars 76 and 78 connected to vertical member 80, and is adapted to swing from the position shown in FIGS. 1 and 3 parallel with the stall sides to the transverse position shown in FIG. 4. The false door is connected to gate 34 by a linkage consisting of a vertical bar or tube 90 and horizontal bar 92, and an arm 94 which in turn is rigidly connected to vertical member 46 of the gate, the bar 92 being pivotally connected to bar 90 by pivot bolt 96 and to arm 94 by pivot pin 98. Movement of the false gate 70 from the position in FIGS. 1 and 3, i.e, parallel with sidewall 18, to its transverse position across the stall, moves the gate from its closed position shown in FIG. 3 to its fully opened position shown in FIG. 4. The false gate and gate 34 are yieldably held in the position shown in FIG. 3 by an over center spring 100 connected to pivot bolt 96 and to an arm 102 secured to bar 22 of wall 18. This spring operates to releasably hold the door in closed position when the door has been closed, and to yieldably hold the door in the open position by a similar over center action, as illustrated in FIG. 4, when the door is in its fully opened position.

In the operation of the present sow pen with the pen ready to receive a sow, gate 34 is in its open position and false gate 70 is in its transverse position as illustrated in FIG. 4. The gate and false gate are releasably held in that position by an over center spring 100. When the feed is placed in trough 58, the sow enters the stall, and as she reaches the false gate, she presses forwardly on the false gate, causing it to swing from the position shown in FIG. 4 to the position shown in FIG. 3, thus pulling gate 34 to its closed position. With the sow in this position, she can readily reach the feed by extending her head into the container, and the false gate is retained in the position shown in FIG. 3 and is firmly held therein against other sows attempting to open gate 34. Any movement in the direction to open gate 34 results in the movement of false gate 70 against the shoulder or side of the sow in the stall, thus preventing movement of either the gate or false gate from closed position. After the sow has finished feeding, she merely backs from the stall against gate 34, thus causing it to open and causing false gate 70 to swing to its transverse position as illustrated in FIG. 4.

While the releasable arrangement utilizing spring 100 for retaining gate 34 in its open position is the preferred form, the spring may be dispensed with by placing a stop on the gate so that it will stand slightly open to permit the sow to extend her nose into the opening and push the gate to open position. When the sow enters and engages false gate 70, the false gate is pushed to the position shown in FIG. 3, thus closing gate 34, which is held in its closed position by the shoulder or side of the sow in the manner as described previously herein when the spring is used. The gate operating mechanism basically works the same, either with or without spring 100.

While only one embodiment of the present sow stall has been described herein, various changes and modifications may be made without departing from the scope of the invention.

I claim:

1. A sow stall comprising structures forming opposite sidewalls, an opening in one end for entrance and exit of a sow, a single gate pivotally mounted at the end of one sidewall for closing said opening, said pivot means supporting said gate for swinging movement from substantially closed position to fully opened position, a container near the other end of the stall for feed, a means pivotally mounted on the same side as said gate in spaced relation thereto forming a movable obstruction between said ends for movement by the sow entering the stall, a linkage connecting said obstruction means with said gate for moving said gate to closed position as a sow approaches said feed container, and a spring means connected to said movable obstruction and to a single fixed anchor point to form an overcenter connection for retaining said gate in either its closed or opened position.

2. A sow stall as defined in claim 1 in which said means forming a movable obstruction is pivoted to one of the sidewalls and swings from a position parallel with one sidewall to a position substantially transverse to said stall as said gate swings from substantially closed to substantially opened position.

3. A sow stall as defined in claim 1 in which said linkage consists of a bar connected to said obstruction means and to said gate and is positioned at a point in said stall above the normal height of a sow.

4. A sow stall as defined in claim 2 in which said linkage consists of a bar connected to said obstruction means and to said gate and is positioned at a point in said stall above the normal height of a sow.

5. A sow stall as defined in claim 1 in which said spring urges said obstruction means toward opened position when said gate approaches its opened position and toward its position parallel with the stall sides when said gate approaches closed position.

6. A sow stall as defined in claim 5 in which said spring is a coil spring attached to said linkage at one end and is anchored to the same wall at which said obstruction means is pivoted.

7. A sow stall as defined in claim 1 in which said sidewall structures are constructed of a plurality of spaced, horizontal tubular members and said gate consists of a series of spaced tubular members.